Oct. 30, 1928.  G. A. COLLINS  1,689,862

REROLL DEVICE

Filed Aug. 23, 1926

WITNESSES:

INVENTOR
George A. Collins.
BY
ATTORNEY

Patented Oct. 30, 1928.

1,689,862

UNITED STATES PATENT OFFICE.

GEORGE A. COLLINS, OF FRESNO, CALIFORNIA, ASSIGNOR TO WESTINGHOUSE ELECTRIC & MANUFACTURING COMPANY, A CORPORATION OF PENNSYLVANIA.

REROLL DEVICE.

Application filed August 23, 1926. Serial No. 131,091.

My invention relates to re-roll devices and particularly to devices for re-rolling the charts or record sheets of recording instruments.

One object of my invention is to provide a device of the above-indicated character that shall permit positive interlocking relation between the driving and the driven elements in order that the elements may move in unison and that shall also permit the elements to move relatively.

Another object of my invention is to provide a re-roll device especially adapted for a graphic meter that shall maintain the chart or record sheet under substantially constant tension.

A further object of my invention is to provide a graphic meter re-roll device that shall be simple and durable in construction, economical to manufacture and effective in its operation.

In a graphic meter or similar device, the flexible record sheet or tape is fed from a supply roller to a take-up roller, and it is desirable to have the flexible element so fed as to maintain it under substantially constant tension. Otherwise, it is likely to buckle and pile up to destroy the record, to become entangled with the instrument mechanism and to cause trouble, delays and loss in other ways.

Various suggestions have been made to overcome the above-mentioned objections such as friction clutches, tension belts and other devices, which have been more or less complicated and expensive.

It is my aim to overcome the above-mentioned objections in a simple, economical way and to provide a graphic meter that shall operate effectively over long periods of time without attention.

Accordingly, in practicing my invention, I provide driving and driven elements, one of which so alternately engages and releases the other as to positively drive the chart during one definite period or cycle of operation and to permit adjustment of the same during the remainder of said period.

Figure 1:
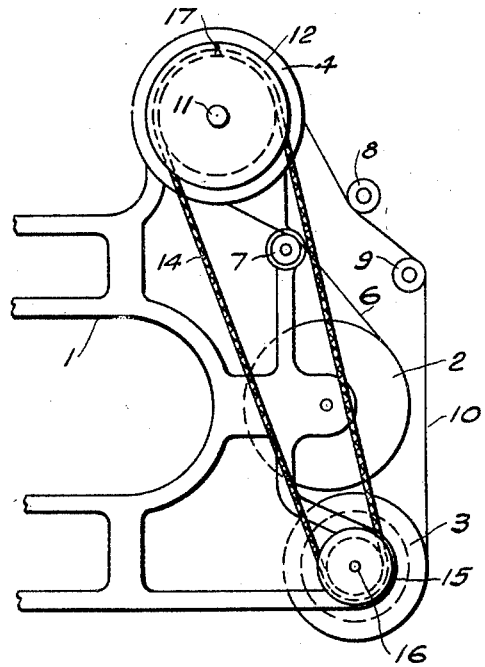
Figure 3:
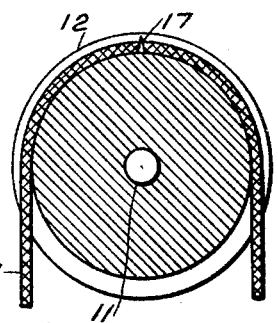
Figure 2:
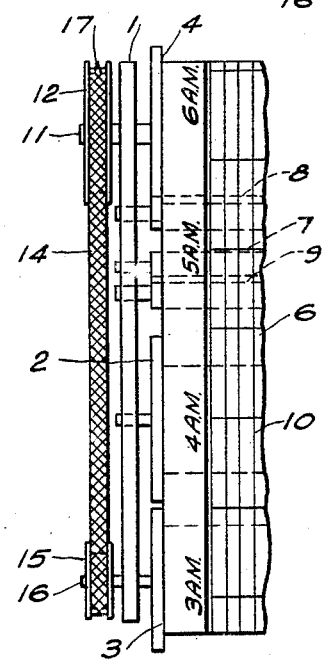

Figure 1 of the accompanying drawing is a fragmentary side elevational view of a graphic measuring instrument embodying my invention, Fig. 2 is a fragmentary front elevational view of the strument shown in Fig. 1, and Fig. 3 is an enlarged detail view, partially in elevation and partially in section, of a portion of the instrument shown in the other figures.

The device comprises, in general, a frame work or bracket structure 1 on which are mounted a supply roller 2, a take-up roller 3 and a drive roller 4.

A sheet of recording paper 6 extends from the supply roller 2, over an idler roller 7, to the drive roller 4 from whence it extends, over idler rollers 8 and 9, to the take-up roller 3. A portion 10 of the chart 6, between the idler roller 9 and the take-up roller 3, is adapted for co-operation with a pen or stylus (not shown) and is the portion which is particularly desirable to maintain under constant tension.

The drive roller 4 is mounted on a shaft 11 and is adapted to be driven at a constant speed by any suitable device such as a clockwork mechanism (not shown).

A pulley 12 mounted on the shaft 11 is connected by a belt 14 to a pulley 15 that is mounted on a shaft 16 on which the take-up roller 3 is also mounted.

The pulley 16 is preferably of smaller diameter than the pulley 12 so that there is a constant tendency to increase the speed of the take-up roller 3 to maintain the portion 10 of the chart under tension.

The flexible element or belt 14 is constructed of yielding material, such as woven fiber or metal threads, in order that it may be readily pierced by a relative sharp pin or projection 17 on the perimeter or bearing surface of the pulley 12. The pulley 15 is preferably provided with a roughened or other surface to prevent slippage between the belt 14 and the pulley 15, whereas the surface of the pulley 12 is smooth to permit slippage between the belt 14 and the pulley 12 when the pin 17 is not in engagement with the belt.

In operation, with the drive roller 4 rotating in the clockwise direction as viewed in Fig. 1, the pin 17 pierces or indents the belt 14 to be positively interlocked therewith during somewhat more than one-half of a revolution of the pulley 12. During this period, since the belt does not slip with respect to the take-up pulley 15, the parts are positively related, thus tending, by reason of the different diameters of the pulleys, to exert a tension on the chart 6.

However, during the time that the pin 17 is out of engagement with the belt 14, the belt may slip relative to the drive pulley 12 or be driven thereby at a slower rate of speed through slight frictional contact therewith. Thus, compensation for the constantly changing diameter of the take-up roller is effected in a simple effective manner by an economical structure that is not apt to get out of order and that may readily be repaired.

While I have shown and described a particular form of my invention, changes may be effected therein without departing from the spirit and scope thereof as set forth in the appended claims.

I claim as my invention:

1. In a re-roll device, the combination with drive and take-up rollers, of means for driving the take-up roller comprising driving elements having positive interlocking relation during a portion of the driving cycle and a slip relation during another portion of the cycle.

2. In a re-roll device, the combination with drive and take-up rollers, of means connecting the rollers to have positive interlocking relation during a portion of the driving cycle and slip relation during another portion of the cycle.

3. In a re-roll device, the combination with drive and take-up rollers, of means for driving the take-up roller comprising driving elements having positive interlocking relation during a portion of the driving operation and friction slip relation during another portion of said operation.

4. The combination with a pair of pulleys and belt connecting the same, of means for alternately positively interlocking said felt to one of said pulleys to move therewith and permitting movement of the belt relative thereto.

5. The combination with a pair of pulleys and a belt connecting the same, of means for positively interlocking the belt to one of said pulleys to move therewith and permitting movement of the belt relative thereto, comprising means on said one pulley for alternately engaging and disengaging the belt.

6. The combination with a rotatable element and a belt co-operating therewith, of means for positively interlocking said element and belt to move in unison and permitting relative movement between the element and belt comprising means for alternate engagement and disengagement of the belt and the element.

7. The combination with a rotatable element and a flexible element co-operating therewith, of means for alternately positively interlocking said elements to move in unison and permitting relative movement of the elements comprising a projection on one of the elements for alternate indenting engagement and disengagement with the other.

8. The combination with a rotatable element and a flexible element co-operating therewith, said flexible element being constructed of yielding material, of means for alternately positively interlocking said elements to move in unison and permitting relative movement of the elements, comprising a relatively sharp-pointed projection on the rotatable element for indenting said yielding element.

9. The combination with a rotatable element and a flexible element co-operating therewith, said flexible element being constructed of woven material, of means for alternately positively interlocking said elements to move in unison and permitting relative movement of the elements, comprising a relatively sharp-pointed projection on the rotatable element for engaging said woven element.

10. In a re-roll device, the combination with drive and take-up rollers and a pulley mounted to rotate with each thereof, of a belt of engageable material connecting the pulleys and a relatively sharp-pointed projection on the drive pulley for engaging and positively driving the belt during a portion of each revolution of the drive pulley and for releasing the belt to permit relative slip between the drive pulley and the belt during the remainder of each revolution of the drive pulley.

In testimony whereof, I have hereunto subscribed my name this tenth day of August, 1926.

GEORGE A. COLLINS.